United States Patent
Dai et al.

(10) Patent No.: US 11,855,755 B2
(45) Date of Patent: Dec. 26, 2023

(54) WDM1R COMBINER FOR PON

(71) Applicant: ZHEJIANG UNIVERSITY, Zhejiang (CN)

(72) Inventors: Daoxin Dai, Zhejiang (CN); Dajian Liu, Zhejiang (CN)

(73) Assignee: ZHEJIANG UNIVERSITY, Zhejiang (CN)

(*) Notice: Subject to any disclaimer, the term of this patent is extended or adjusted under 35 U.S.C. 154(b) by 63 days.

(21) Appl. No.: 17/780,027

(22) PCT Filed: Nov. 27, 2020

(86) PCT No.: PCT/CN2020/132121
§ 371 (c)(1),
(2) Date: May 26, 2022

(87) PCT Pub. No.: WO2021/232731
PCT Pub. Date: Nov. 25, 2021

(65) Prior Publication Data
US 2022/0416930 A1    Dec. 29, 2022

(30) Foreign Application Priority Data
May 22, 2020  (CN) .......................... 202010441561.0

(51) Int. Cl.
*H04J 14/02*  (2006.01)
*G02B 6/02*  (2006.01)
*G02B 6/293*  (2006.01)

(52) U.S. Cl.
CPC ...... *H04J 14/0205* (2013.01); *G02B 6/02076* (2013.01); *G02B 6/2938* (2013.01); *G02B 6/29304* (2013.01); *H04J 14/0278* (2013.01)

(58) Field of Classification Search
CPC .............. H04J 14/0205; H04J 14/0278; G02B 6/02076; G02B 6/29304; G02B 6/2938
(Continued)

(56) References Cited

U.S. PATENT DOCUMENTS 6,185,023 B1 *  2/2001  Mizrahi .............. H04J 14/0213
                                                               398/9
9,306,700 B2 *  4/2016  Zhu ..................... H04J 14/0224
(Continued)

FOREIGN PATENT DOCUMENTS

CN      102013921      4/2011
CN      102480651      5/2012
(Continued)

OTHER PUBLICATIONS

Dajian Liu et al., "Low-loss and low-crosstalk silicon triplexer based on cascaded multimode waveguide gratings," Optics Letters, vol. 44, Issue 6, Mar. 2019, pp. 1304-1307.
(Continued)

*Primary Examiner* — Dalzid E Singh
(74) *Attorney, Agent, or Firm* — JCIPRNET

(57) ABSTRACT

A WDM1r combiner for a PON. The output end of an input waveguide is connected to the input end of a first grating filter, the output end of the first grating filter is connected to the input ends of a first mode filter, a second grating filter, a second mode filter, a connecting waveguide, a third grating filter, a third mode filter, and a fourth grating filter in sequence, and the output end of the fourth grating filter is connected to an output waveguide. The function of the WDM1r combiner for a PON is achieved in the form of cascaded grating filters; different central wavelengths and bandwidths of four channels are obtained by optimizing a grating structure; an on-chip WDM1r combiner which is low in insertion loss and crosstalk and has flat-top response is obtained; the combiner has the advantages of being simple in structure, simple in process, excellent in performance, etc.

7 Claims, 2 Drawing Sheets

(58) Field of Classification Search
USPC .......................................................... 398/83
See application file for complete search history.

(56) References Cited

U.S. PATENT DOCUMENTS

| | | | |
|---|---|---|---|
| 10,852,472 B1* | 12/2020 | Ling | ..................... G02B 6/124 |
| 11,002,980 B1* | 5/2021 | Ling | ................... G02B 27/1086 |
| 2012/0148250 A1* | 6/2012 | Xu | ..................... H04J 14/0227 |
| | | | 398/67 |

FOREIGN PATENT DOCUMENTS

| | | |
|---|---|---|
| CN | 105759362 | 7/2016 |
| CN | 105866893 | 8/2016 |
| CN | 109407209 | 3/2019 |
| CN | 109870767 | 6/2019 |
| CN | 111736266 | 10/2020 |
| JP | 2015152721 | 8/2015 |

OTHER PUBLICATIONS

Dajian Liu et al., "First demonstration of an on-chip quadplexer for passive optical network systems," Photonics Research, vol. 9, Issue 5, May 2021, pp. 757-763.

"International Search Report (Form PCT/ISA/210) of PCT/CN2020/132121," dated Feb. 25, 2021, with English translation thereof, pp. 1-4.

"Office Action of China Counterpart Application", dated Mar. 1, 2021, p. 1-p. 7.

* cited by examiner

US 11,855,755 B2

WDM1R COMBINER FOR PON

CROSS-REFERENCE TO RELATED APPLICATION

This application is a 371 of international application of PCT application serial no. PCT/CN2020/132121, filed on Nov. 27, 2020, which claims the priority benefit of China application no. 202010441561.0, filed on May 22, 2020. The entirety of each of the above mentioned patent applications is hereby incorporated by reference herein and made a part of this specification.

FIELD OF THE DISCLOSURE

The disclosure belongs to an optical waveguide combiner in the field of optical communication, in particular to a WDM1r (wavelength division multiplexing equipment) combiner for a PON (passive optical network).

DESCRIPTION OF RELATED ART

With the rapid development of 4K/8K video network, big data, smart Internet of Things and VR virtual reality, etc., the demand for gigabit network is continuously growing, and the large-scale deployment of 10G PON (Passive Optical Network) has been formed gradually. For the GPON network that operators are deploying in a large scale, since the users' demand for bandwidth is increasing stepwise, only some users' networks need to upgrade to 10G GPON network in a short term. Besides, the cutover from all existing networks to 10G GPON network requires a considerable level of engineering and a high cost; therefore, it is desired to smoothly upgrade the existing GPON network to a 10G GPON network without affecting existing services. In the process of upgrading network smoothly, WDM1r combiner is one of the most important components. This component is compatible with different uplink and downlink wavelengths of GPON and 10G GPON, so that different operating wavelengths may be separated into different PON ports. According to the requirements of the international communication protocol ITU-T G.987.4 standard, the WDM1r (Wavelength Division Multiplexing First Revision) combiner needs to multiplex the signals of four channels into the same fiber, and the signals include the uplink signal of 10G GPON with a wavelength of 1270 nm, the uplink signal of GPON with a wavelength of 1310 nm, the downlink signal of GPON with a wavelength of 1490 nm, and the downlink signal of 10G GPON with wavelength of 1577 nm; the bandwidths corresponding to the four channels are 20 nm, 40 nm, 20 nm and 5 nm, respectively.

Most of the currently adopted WDM1r combiners are composed of separate components coupled together, which are expensive, large in size, and difficult to package, and far from satisfying the development of future communication optical devices. On-chip WDM demultiplexers based on planar optical waveguides have attracted much attention due to their characteristics of being easily processed, small size and low cost. At present, there is still a lack of WDM1r combiners based on planar optical waveguides. Other than satisfying the wavelengths and bandwidths of the four channels as required above, it is also necessary for each channel to meet the requirements of flat-top response, low crosstalk, low loss, etc., so as to ensure the excellent performance of the communication system.

SUMMARY OF THE DISCLOSURE

In order to solve the existing problems in the conventional technology, the present disclosure provides a WDM1r combiner for a PON, which in particular conforms to international communication protocol ITU-T G.987.4 standard.

The technical solution adopted in the present disclosure is:

The present disclosure includes an input waveguide, a connecting waveguide, an output waveguide, a first grating filter, a second grating filter, a third grating filter, a fourth grating filter, a first mode filter, a second mode filter and a third mode filter. The output end of the input waveguide is connected to the input end of the first grating filter. The output end of the first grating filter is connected to the input end of the fourth grating filter through the first mode filter, the second grating filter, the second mode filter, the connecting waveguide, the third grating filter, and the third mode filter in sequence. The output end of the fourth grating filter is connected to the output waveguide. The central wavelength of the first grating filter is 1270 nm, the central wavelength of the second grating filter is 1310 nm, the central wavelength of the third grating filter is 1490 nm, and the central wavelength of the fourth grating filter is 1577 nm.

The four grating filters described above are similar in structure, each grating filter is mainly composed of a mode demultiplexer, a multi-mode waveguide grating and an output gradient waveguide connected in sequence, n=1, 2, 3, 4. The mode demultiplexer adopts an asymmetric directional coupler, an adiabatic evolution coupler, a grating-assisted coupler and other structures, including input waveguide, download waveguide, mode demultiplexing operating area and output waveguide. The input end of the input waveguide is connected to the output end of the mode filter previously connected to the current grating filter. The output end of the input waveguide and the input end of the download waveguide are all connected to one end of the mode demultiplexing operating area, and the other end of the mode demultiplexing operating area is connected to the input end of the output waveguide. The output end of the output waveguide is connected to the input end of the multi-mode waveguide grating. The input end of the input waveguide is used as the input end of the mode demultiplexer, the output end of the output waveguide is used as the output end port of the mode demultiplexer, and the output end of the download waveguide is used as the download port of the mode demultiplexer, and is also the output waveguide of the WDM1r combiner, namely the first output waveguide, the second output waveguide, the third output waveguide and the fourth output waveguide.

The multi-mode waveguide grating structure of the four grating filters is mainly composed of a front gradient grating, an asymmetric multi-mode waveguide grating and a rear gradient grating connected in sequence. The input end of the front gradient grating is used as the input end of the multi-mode waveguide grating, and the output end of the rear gradient grating is used as the output end of the multi-mode waveguide grating.

In the front gradient grating of the multi-mode waveguide grating, the depth of the grating teeth is linearly gradient from zero to the depth of the asymmetric multi-mode waveguide grating. For the rear gradient grating of the multi-mode waveguide grating, the depth of its grating teeth is linearly gradient from the depth of the asymmetric multi-mode waveguide grating to zero. Through the front gradient grating, the mode mismatch between the waveguide mode and the grating mode is reduced, the loss caused by the mode mismatch is decreased, so that the device loss is further lowered.

The input waveguide is an input end port of a channel signal with operating wavelengths of 1270 nm and 1310 nm, and is also an output end port of a channel signal with operating wavelengths of 1490 nm and 1577 nm. The first output waveguide is an output end port of a channel signal with an operating wavelength of 1270 nm. The second output waveguide is an output end port of a channel signal with an operating wavelength of 1310 nm. The third output waveguide is an input end port of a channel signal with an operating wavelength of 1490 nm. The fourth output waveguide is an input end port of a channel signal with an operating wavelength of 1577 nm.

The central Bragg wavelengths of the asymmetric multi-mode waveguide gratings of the first grating filter, the second grating filter, the third grating filter and the fourth grating filter are 1270 nm, 1310 nm, 1490 nm and 1577 nm respectively, and the corresponding bandwidths are 20 nm, 40 nm, 20 nm and 5 nm respectively.

The channel signal with an operating wavelength of 1270 nm is used as the uplink signal of 10G GPON, the channel signal with an operating wavelength of 1310 nm is used as the uplink signal of GPON, the channel signal with an operating wavelength of 1490 nm is used as the downlink signal of GPON, and the channel signal with an operating wavelength of 1577 nm is used as the downlink signal of 10G GPON. The WDM1r combiner realizes two-way communication transmission and integrates the uplink and downlink signals of GPON and 10G GPON.

The asymmetric multi-mode waveguide grating realizes the reverse coupling of the $TE_0$ mode to the $TE_1$ mode, which satisfies the phase matching condition $(n_0+n_1)/2=\lambda/\Lambda$. In the formula, $n_0$ is the effective refractive index of the $TE_0$ mode, and $n_1$ is the effective refractive index of the $TE_1$ mode, $\lambda$ is the Bragg wavelength, and $\Lambda$ is the grating teeth period.

The $TE_0$ mode and the $TE_1$ mode refer to the transverse electric fundamental mode and the transverse electric first-order mode, respectively.

The asymmetric multi-mode waveguide grating of the multi-mode waveguide grating adopts an apodized grating structure, thereby obtaining a filter with a high side mode suppression ratio, thus reducing the crosstalk between two uplink (downlink) channels.

The mode filter filters out the high-order transverse electric mode in the waveguide and retains the transverse electric fundamental mode, which may be performed by, but not limited to, a structure such as a curved waveguide.

The mode demultiplexer may be composed of adiabatic gradient coupled waveguides, asymmetric directional coupled waveguides, and grating-assisted coupled waveguides, etc., and may realize the multiplexation and demultiplexation of the transverse electric fundamental mode ($TE_0$) and the first-order transverse electric mode ($TE_1$).

In the front gradient grating of the multi-mode waveguide grating, the depth of the grating teeth is linearly gradient from zero to the depth of the asymmetric multi-mode waveguide grating. For the rear gradient grating of the multi-mode waveguide grating, the depth of its grating teeth is linearly gradient from the depth of the asymmetric multi-mode waveguide grating to zero. Through the front (rear) gradient grating, the mode mismatch between the waveguide mode and the grating mode is reduced, the loss caused by the mode mismatch is decreased, so that the device loss is further lowered.

The three mode filters mentioned above may reduce the crosstalk between the two uplink (downlink) channels by filtering out high-order modes, and obtain a WDM1r combiner with low crosstalk. The mode filter may adopt, but is not limited to, a structure of a curved waveguide.

The advantageous effects of the present disclosure are:

The present disclosure multiplexes the channel signal with the operating wavelength of 1270 nm, the channel signal with the operating wavelength of 1310 nm, the channel signal with the operating wavelength of 1490 nm and the channel signal with the operating wavelength of 1577 nm into an optical waveguide in the form of cascaded grating filters to realize an on-chip WDM1r combiner.

By adjusting the width, period and teeth depth of the multi-mode waveguide grating, the present disclosure achieves 20 nm of channel bandwidth at the channel center with wavelength of 1270 nm, achieves 40 nm of channel bandwidth at the channel center with wavelength of 1310 nm, achieves 20 nm of channel bandwidth at the channel center with wavelength of 1490 nm, and achieves 5 nm of channel bandwidth at the channel center with wavelength of 1577 nm. The central wavelength and bandwidth of each channel may well meet the requirements of the international communication protocol ITU-T G.987.4 standard.

The present disclosure may reduce the crosstalk between channels through the specially designed and constructed waveguide structure combining mode filter, apodized grating and gradient grating, so as to obtain a WDM1r combiner with low crosstalk, low loss and each channel has a flat-top response spectrum.

The disclosure may be fabricated by a plane integrated optical waveguide process, and only needs one etching to complete the fabrication. The process is simple, low in cost, low in loss, low in crosstalk, and compatible with conventional CMOS processes, and has the potential for mass production.

To sum up, the present disclosure realizes the function of the WDM1r combiner in the form of cascaded multi-mode waveguide gratings, obtains different central wavelengths and bandwidths of four channels by optimizing a grating structure, obtains an on-chip WDM1r combiner which is low in insertion loss and crosstalk; the combiner has the advantages of being simple in structure, simple in process, excellent in performance, etc.

In figure: 1 is an input waveguide, 2 is a connecting waveguide, 3 is an output waveguide; a1 is a first grating filter, a2 is a second grating filter, a3 is a third grating filter, a4 is a fourth grating filter, b1 is a first mode filter, b2 is a second mode filter, b3 is a third mode filter.

an1 (n=1, 2, 3, 4) is the mode demultiplexer of the n-th grating filter, an2 is the multi-mode waveguide grating of the n-th grating filter, and n08 is the output gradient waveguide of the n-th grating filter;

n01 is the input waveguide of the mode demultiplexer in the n-th grating filter, n02 is the download waveguide of the mode demultiplexer in the n-th grating filter, n03 is the demultiplexing operating area of the mode demultiplexer in the n-th grating filter, n04 is the output waveguide of the mode demultiplexer in the n-th grating filter; n05 is the front gradient grating of the multi-mode waveguide grating in the n-th grating filter, n06 is the asymmetric multi-mode waveguide grating of the multi-mode waveguide grating in the n-th grating filter, n07 is the rear gradient grating of the multi-mode waveguide grating in the n-th grating filter.

DESCRIPTION OF EMBODIMENTS

The present disclosure will be further described below with reference to the accompanying drawings and embodiments.

Figure 1:
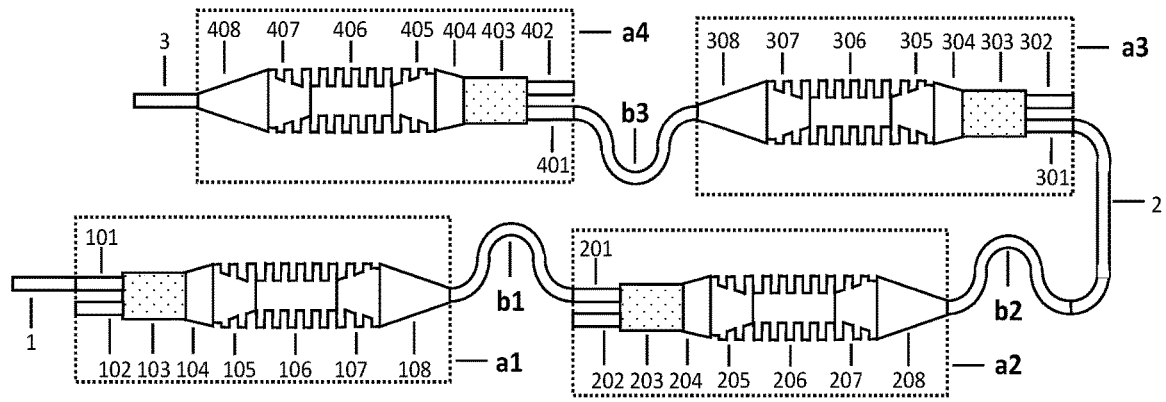
FIG. 1 is a schematic view of the overall structure of a WDM1r combiner for a PON.

As shown in FIG. 1, the specific implementation of the present disclosure includes four cascaded grating filters, namely a first grating filter a1, a second grating filter a2, a third grating filter a3 and a fourth grating filter a4. The four grating filters are connected in sequence through their heads and tails, and a mode filter (b1, b2 and b3) is included between two adjacent grating filters, and the curved connecting waveguide 2 allows the structure more compact.

Specifically, the disclosure includes an input waveguide 1, a connecting waveguide 2, an output waveguide 3, a first grating filter a1, a second grating filter a2, a third grating filter a3, a fourth grating filter a4, a first mode filter b1, a second mode filter b2, and a third mode filter b3. The output end of the input waveguide 1 is connected to the first grating filter a1. The first grating filter a1, the first mode filter b1, the second grating filter a2, the second mode filter b2, the connecting waveguide 2, the third grating filter a3, the third mode filter b3, and the fourth grating filter a4 are connected in sequence. The output end of the fourth grating filter a4 is connected to the output waveguide 3. The download waveguides 102, 202, 302 and 402 of the mode demultiplexer of the four grating filters are the download ends of the four grating filters respectively, and the four waveguides are the first output waveguide, the second output waveguide, the third output waveguide and the fourth output waveguide in sequence. The input waveguide 1 serves as the input end port of the channel signal with operating wavelengths of 1270 nm and 1310 nm, and also serves as the output end port of the channel signal with operating wavelengths of 1490 nm and 1577 nm. The first output waveguide 106 is the output end port of the channel signal with an operating wavelength of 1270 nm, the second output waveguide 206 is the output end port of the channel signal with an operating wavelength of 1310 nm, the third output waveguide 306 is the input end port of the channel signal with an operating wavelength of 1490 nm, and the fourth output waveguide 406 is the input end port of the channel signal with an operating wavelength of 1577 nm. The three mode filters b1, b2 and b3 all adopt a curved waveguide structure.

Figure 2:
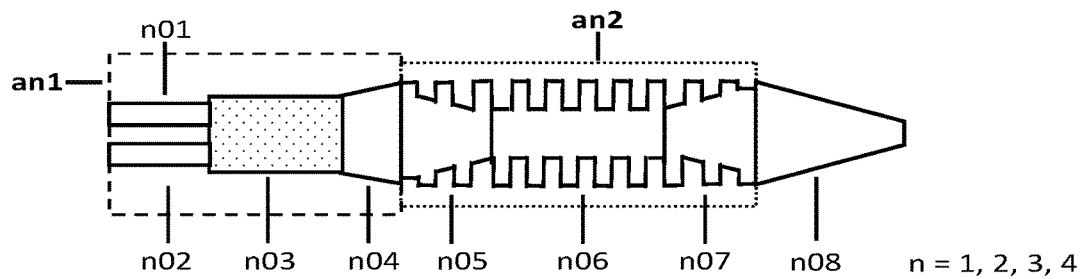
FIG. 2 is a schematic view of a grating filter.

As shown in FIG. 2, the four grating filters include a mode demultiplexer and (n=1, 2, 3, 4), a multi-mode waveguide grating an2 and an output gradient grating n08. The mode demultiplexer mainly includes an input waveguide n01, a download waveguide n02, a mode demultiplexing operating area n03 and an output waveguide n04. The download waveguide 102/202/302/402 of the mode demultiplexer serves as the download end of the grating filter, that is, the first output waveguide, the second output waveguide, the third output waveguide, and the fourth output waveguide.

The multi-mode waveguide grating of the four grating filters is formed by the front gradient grating n05, the asymmetric multi-mode waveguide grating n06 and the rear gradient grating n07 connected in sequence. The other end of the front gradient grating n05 serves as the input end of the multi-mode waveguide grating, the other end of the rear gradient grating n07 serves as the output end of the multi-mode waveguide grating.

The basic structure of the grating filter is shown in FIG. 2. The mode demultiplexer, the multi-mode waveguide grating and the output gradient waveguide are connected in sequence. The left port in the figure is the input end port, the right port is the output end port, and the lower left port is the download port. The mode demultiplexer and may adopt the structure of an adiabatic gradient coupled waveguide, an asymmetric directional coupled waveguide and a grating-assisted coupled waveguide. The $TE_1$ mode input from the right end may be multiplexed to the $TE_0$ mode at the lower left port to be output. The multi-mode waveguide grating meets the phase matching condition of $TE_0$ mode and reverse $TE_1$ mode, the input $TE_0$ mode may be reversely coupled into the $TE_1$ mode near the Bragg resonance condition. By selecting the total width of the grating, the depth of the grating teeth and the grating period, the required central wavelength and bandwidth may be obtained. By adopting the apodized grating structure (which may be realized through the Gaussian distribution traversing along the axial direction of the grating teeth on both sides), a filter with a high side mode suppression ratio may be obtained, thereby reducing the crosstalk between various signal channels.

The central Bragg wavelengths of the asymmetric multi-mode waveguide gratings of the first grating filter a1, the second grating filter a2, the third grating filter a3 and the fourth grating filter a4 are 1270 nm, 1310 nm, 1490 nm and 1577 nm respectively, and the corresponding bandwidths are 20 nm, 40 nm, 20 nm and 5 nm respectively.

The operating process when the present disclosure is used as the WDM1r combiner is described below.

Figure 3:
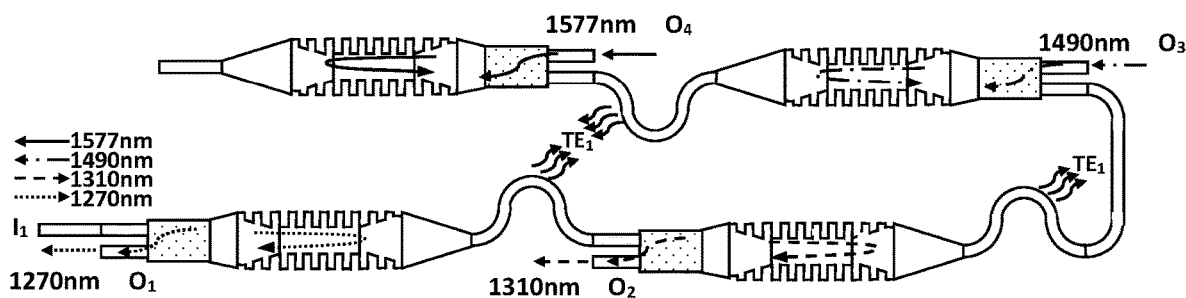
FIG. 3 is a schematic view of the operating principle of the WDM1r combiner for a PON.
Figure 4A:
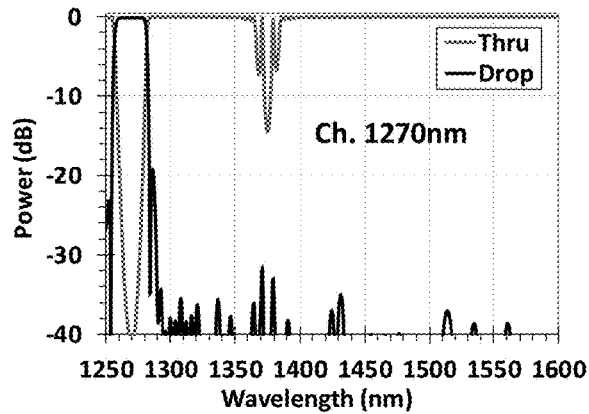
FIGS. 4A to 4D are simulation result diagrams of various grating filter multi-mode waveguide gratings of a device described in an embodiment.
Figure 4B:
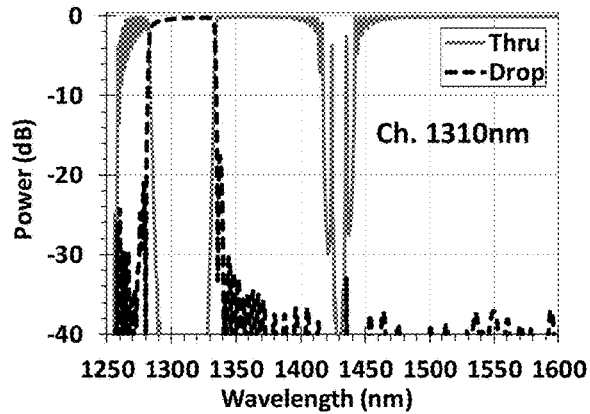
Figure 4C:
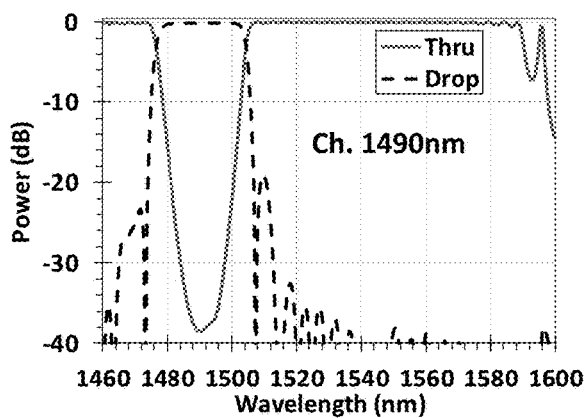
Figure 4D:
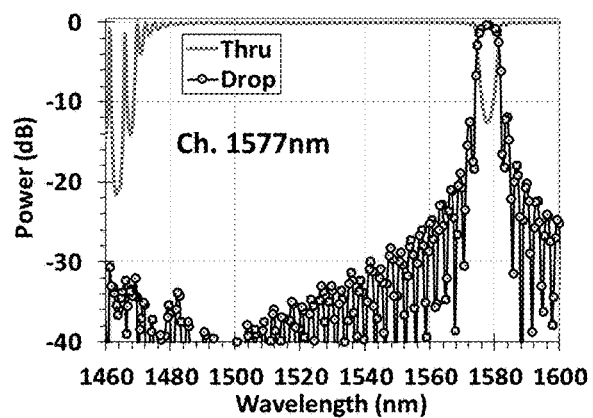

The operating principle of the present disclosure is shown in FIG. 3. When operating in the channel with a wavelength of 1270 nm and the channel with a wavelength of 1310 nm, the fundamental mode signal is input from the input end $I_1$ of the input waveguide. After passing through the first grating filter, the channel signal with an operating wavelength of 1270 nm is output from the download port $O_1$ of the first grating filter. After passing through the first grating filter almost lossless, the channel signal with an operating wavelength of 1310 nm passes through the second grating filter, and is output from the download port $O_2$ of the second grating filter. When operating in the channel with an wavelength of 1490 nm, the fundamental mode signal is input from the download port $O_3$ of the third grating filter, reversely coupled into the main waveguide through the third grating filter, passes through the second grating filter and the first grating filter almost lossless, and is finally output from the input end $I_1$ of the input waveguide. When operating in the channel with an wavelength of 1577 nm, the fundamental mode signal is input from the download port $O_4$ of the fourth grating filter, reversely coupled into the main waveguide through the fourth grating filter, passes through the third grating filter, the second grating filter and the first grating filter almost lossless, and is finally output from the input end $I_1$ of the input waveguide, thereby realizing the function of the WDM1r combiner. By introducing apodized gratings, gradient gratings and mode filters, the Fabry-Perot interference between various gratings is suppressed, the crosstalk between various channels is reduced (the isolation between the channels is improved), and a WDM1r combiner with low crosstalk and low insertion loss is obtained.

The specific embodiments of the present disclosure are as follows:

A silicon nanowire optical waveguide based on silicon-on-insulator (SOI) material is selected: the core layer thereof is silicon material, the thickness is 220 nm, and the refractive index is 3.4744; the lower/upper cladding material thereof is SiO$_2$, the thickness of the lower cladding layer SiO$_2$ is 2 μm, the thickness of the upper cladding layer SiO$_2$ is 1 μm, and the refractive index is 1.4404.

The mode demultiplexer of the grating filter adopts the structure of the adiabatic gradient coupled waveguide.

For the asymmetric multi-mode waveguide grating of the first grating filter, the selected parameters are: the total width of the grating is 850 nm, the depth of the grating teeth is 185 nm, the grating period is 256 nm, the number of grating periods is 200, the duty cycle of the grating is 0.5, and the number of the front/rear gradient grating periods is 20.

For the asymmetric multi-mode waveguide grating of the second grating filter, the selected parameters are: the total width of the grating is 850 nm, the depth of the grating teeth is 220 nm, the grating period is 278 nm, the number of grating periods is 100, the duty cycle of the grating is 0.5, and the number of the front/rear gradient grating periods is 20.

For the asymmetric multi-mode waveguide grating of the third grating filter, the selected parameters are: the total width of the grating is 1100 nm, the depth of the grating teeth is 240 nm, the grating period is 240 nm, the number of the grating periods is 200, the duty cycle of the grating is 0.5, and the number of the front/rear gradient grating periods is 20.

For the asymmetric multi-mode waveguide grating of the fourth grating filter, the selected parameters are: the total width of the grating is 1100 nm, the depth of the grating teeth is 180 nm, the grating period is 324 nm, the number of the grating periods is 200, the duty cycle of the grating is 0.5, and the number of the front/rear gradient grating periods is 20.

All of the asymmetric multi-mode waveguide gratings of the four grating filters adopt the phase apodization scheme, and the apodization form is Gaussian apodization.

The asymmetric multi-mode waveguide gratings of the four grating filters of the device are simulated and verified through a three-dimensional finite-difference time-domain algorithm. FIG. 4A to FIG. 4D correspond to the simulation results of the asymmetric multi-mode waveguide gratings of the first grating filter, the second grating filter, the third grating filter and the fourth grating filter. Based on the figures, it may be obtained that the device of the present disclosure may obtain 20 nm, 40 nm, 20 nm and 5 nm of 1 dB bandwidth respectively at the channels with the wavelengths of 1270 nm, 1310 nm, 1490 nm and 1577 nm. All of the three channels have flat-top response, all of the three channels have an insertion loss of <0.5 dB, and all of the four channels have a crosstalk of <−26 dB. It may be obtained that the device of the present disclosure may obtain a WDM1r combiner with low insertion loss and low crosstalk.

The above-mentioned embodiments serve to explain the present disclosure, rather than limit the present disclosure. Within the spirit of the present disclosure and the scope to be protected by the claims, any modifications and changes made to the present disclosure all fall into the scope to be protected by the present disclosure.

What is claimed is:

1. A WDM1r (wavelength division multiplexing equipment) combiner for a PON (passive optical network), comprising: an input waveguide, a connecting waveguide, an output waveguide, a first grating filter, a second grating filter, a third grating filter, a fourth grating filter, a first mode filter, a second mode filter and a third mode filter; wherein an output end of the input waveguide is connected to an input end of the first grating filter, an output end of the first grating filter is connected to an input end of the fourth grating filter through the first mode filter, the second grating filter, the second mode filter, the connecting waveguide, the third grating filter, and the third mode filter in sequence, an output end of the fourth grating filter is connected to the output waveguide; wherein a central wavelength of the first grating filter is 1270 nm, a central wavelength of the second grating filter is 1310 nm, a central wavelength of the third grating filter is 1490 nm, and a central wavelength of the fourth grating filter is 1577 nm.

2. The WDM1r combiner for the PON according to claim 1, wherein:
the four grating filters are similar in structure, each of the grating filters is mainly composed of a mode demultiplexer, a multi-mode waveguide grating and an output gradient waveguide connected in sequence, n=1, 2, 3, 4; the mode demultiplexer comprises an input waveguide, a download waveguide, a mode demultiplexing operating area and an output waveguide, an input end of the input waveguide is connected to an output end of a mode filter previously connected to the current grating filter, an output end of the input waveguide and an input end of the download waveguide are all connected to one end of the mode demultiplexing operating area, and the other end of the mode demultiplexing operating area is connected to an input end of the output waveguide, an output end of the output waveguide is connected to an input end of the multi-mode waveguide grating, the input end of the input waveguide serves as an input end of the mode demultiplexer, the output end of the output waveguide serves as an output end port of the mode demultiplexer, and an output end of the download waveguide serves as a download port of the mode demultiplexer, and serves as an output waveguide of the WDM1r combiner.

3. The WDM1r combiner for the PON according to claim 2, wherein:
the multi-mode waveguide grating structure of the four grating filters is mainly composed of a front gradient grating, an asymmetric multi-mode waveguide grating and a rear gradient grating connected in sequence, wherein an input end of the front gradient grating serves as the input end of the multi-mode waveguide grating, and an output end of the rear gradient grating serves as an output end of the multi-mode waveguide grating.

4. The WDM1r combiner for the PON according to claim 3, wherein:
the asymmetric multi-mode waveguide grating of the multi-mode waveguide grating adopts an apodized grating structure.

5. The WDM1r combiner for the PON according to claim 2, wherein:
the input waveguide is an input end port of a channel signal with operating wavelengths of 1270 nm and 1310 nm, and is an output end port of a channel signal with operating wavelengths of 1490 nm and 1577 nm, a first output waveguide is an output end port of the channel signal with the operating wavelength of 1270 nm, a second output waveguide is an output end port of the channel signal with the operating wavelength of 1310 nm, a third output waveguide is an input end port of the channel signal with the operating wavelength of 1490 nm, and a fourth output waveguide is an input end port of the channel signal with the operating wavelength of 1577 nm;

central Bragg wavelengths of asymmetric multi-mode waveguide gratings of the first grating filter, the second grating filter, the third grating filter and the fourth grating filter are 1270 nm, 1310 nm, 1490 nm and 1577 nm respectively, and corresponding bandwidths are 20 nm, 40 nm, 20 nm and 5 nm respectively.

6. The WDM1r combiner for the PON according to claim 2, wherein:
an asymmetric multi-mode waveguide grating realizes a reverse coupling of a $TE_0$ mode to a $TE_1$ mode, which satisfies a phase matching condition $(n_0+n_1)/2=\lambda/\Lambda$, wherein $n_0$ is an effective refractive index of the $TE_0$ mode, and $n_1$ is an effective refractive index of the $TE_1$ mode, $\lambda$ is a Bragg wavelength, and $\Lambda$ is a grating teeth period.

7. The WDM1r combiner for the PON according to claim 1, wherein:
the mode filters filter out a high-order transverse electric mode in the waveguide and retains a transverse electric fundamental mode, wherein a structure of the mode filters includes a curved waveguide.

* * * * *